United States Patent [19]

Coil et al.

[11] 3,841,147

[45] Oct. 15, 1974

[54] METHOD AND APPARATUS FOR DETERMINING THE INHERENT VISCOSITY OF A LIQUID

[75] Inventors: Michael K. Coil; Thomas W. Eder, both of Fairport, N.Y.

[73] Assignee: Eastman Kodak Company, Rochester, N.Y.

[22] Filed: Feb. 5, 1973

[21] Appl. No.: 329,511

[52] U.S. Cl. ................................ 73/56, 235/151.3
[51] Int. Cl. .......................................... G01n 11/00
[58] Field of Search ..................... 73/54, 55, 56, 59; 235/151.3, 151.34

[56] References Cited
UNITED STATES PATENTS

| | | | |
|---|---|---|---|
| 3,048,030 | 8/1962 | De Haven | 73/56 |
| 3,138,950 | 6/1964 | Welty et al. | 73/55 |
| 3,209,581 | 10/1965 | Crane et al. | 73/55 |
| 3,229,506 | 1/1966 | Bruss et al. | 73/59 |
| 3,252,320 | 5/1966 | Welty | 73/56 |
| 3,493,345 | 2/1970 | Windley | 73/59 X |

*Primary Examiner*—Richard C. Queisser
*Assistant Examiner*—Joseph W. Roskos
*Attorney, Agent, or Firm*—G. E. Grosser

[57] ABSTRACT

A method and apparatus is provided for use in a web producing system wherein a melted polymer resin is extruded to form the web, for automatically determining the inherent viscosity of the polymer resin based on the power consumed by the extruder. A number of physical operating conditions of the extruder are monitored and data produced therefrom which, after being converted into digital form, is used in a data processor for calculating inherent viscosity. The monitored conditions include power input to the drive motor for the extruder, the rotational speed of the extruder metering screw, the temperature of the barrel metal of the extruder, the temperature of the extruded product, and the filter pressure.

7 Claims, 5 Drawing Figures

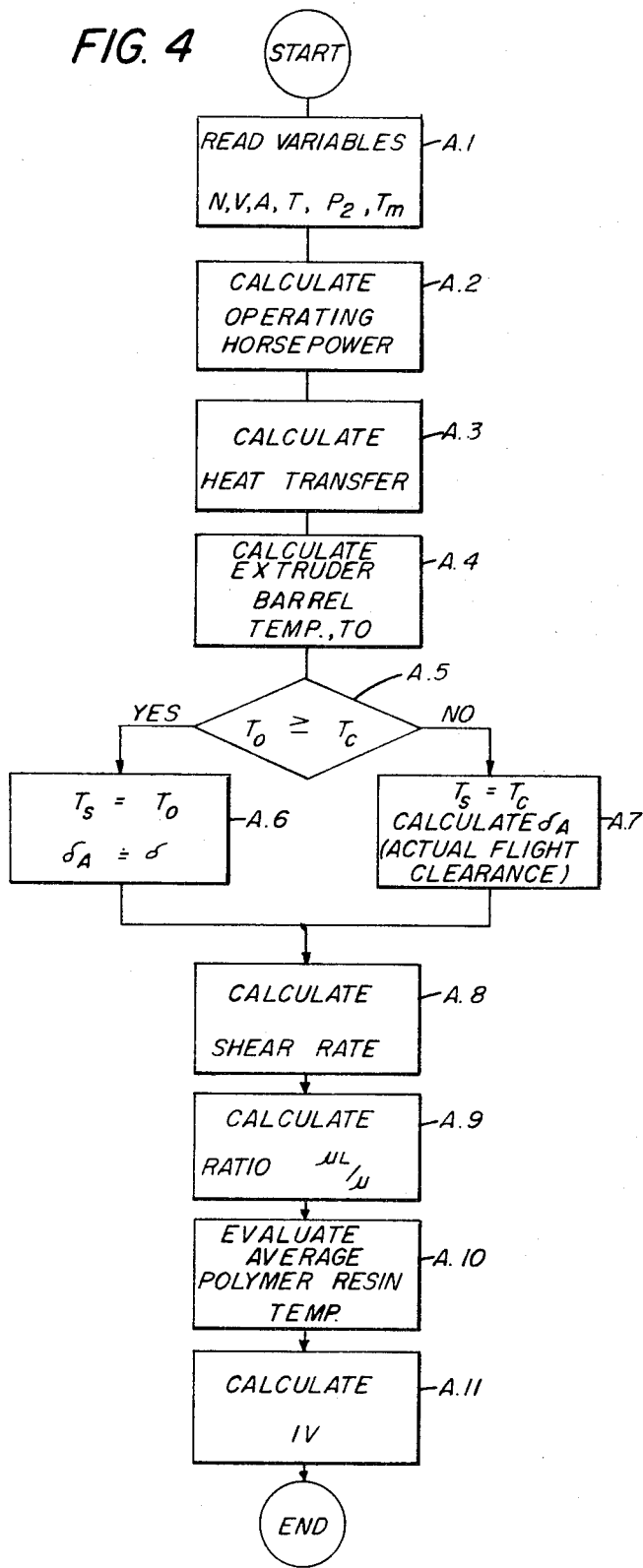

METHOD AND APPARATUS FOR DETERMINING THE INHERENT VISCOSITY OF A LIQUID

BACKGROUND OF THE INVENTION

1. Field of the Invention

The present invention relates to a method and apparatus for determining the inherent viscosity of a liquid and, more particularly, to a method and apparatus for determining the inherent viscosity of a liquid, such as a polymer resin, as a function of the power required to extrude the liquid during the operation of a web producing system.

2. Description of the Prior Art

The process of melting polymer resins and extruding the same through a die onto a rotating drum or wheel to form a web is, of course, well known. It is essential during the performance of this process that molecular weight of the polymer resin being melted be carefully controlled as to avoid producing a web having undesirable characteristics. It has been common practice to monitor the molecular weight of the resin by periodically taking a sample of the unprocessed resin and manually determining the inherent viscosity thereof using laboratory techniques and under laboratory conditions. Since the inherent viscosity of a material is a measure of the molecular weight thereof, these laboratory techniques for determining inherent viscosity have been used as a method of indirectly monitoring the molecular weight of the resin. Considering the undesirable characteristics which are referred to above, if the inherent viscosity of the resin used to produce a web is too high, this will result in increased power and cooling requirements. On the other hand, if the inherent viscosity of the resin is too low, this can result in problems such as tearing of the web when the web is stretched in the machine. Further, a shift in the inherent viscosity may indicate a degradation of the resin has occured which can result in discoloration of the web, and in an extreme case, in carbon particles appearing in the web.

It will be appreciated that, while the determination of the inherent viscosity of a polymer resin under laboratory conditions can yield accurate results, such as approach is time consuming and cumbersome. Further, as the speed of operation of the web producing machines increases, it is desirable to increase the frequency of the inherent viscosity determinations. As this demand for more determinations within a given period increases, it becomes impractical to use the laboratory techniques referred to above.

A number of techniques have been derived in determining viscosity on a more or less continuous basis. In general, these techniques utilized pressure measurements to provide an indication of viscosity and reference is made to U.S. Pat. Nos. 2,598,910 (Head); 2,988,914 (Jones); 3,020,749 (Cropper et al.); 3,111,838 (Bucalo); 3,116,631 (Rosenthal); and 3,138,950 (Welty et al.), as well as Defensive Publication No. T869,014 (Gray, Jr., et al.), for examples, of prior art viscosimeters and like systems for measuring apparent viscosity. It will be appreciated that the patents listed are merely exemplary, and the listing above is not represented to be, or intended to be, comprehensive.

SUMMARY OF THE INVENTION

In accordance with the invention, the problems discussed hereinabove are overcome by automating the determination of the inherent viscosity of a liquid, such as a polymer resin. In its broader aspects, the invention involves determining the inherent viscosity of a resin being extruded through a die by determining the power consumed during the extruding process, and using this determination to calculate the inherent viscosity. More specifically, the inherent viscosity of a melted resin is automatically determined, during the production of a web therefrom, by monitoring the output data, representing selected physical conditions related to extruder power consumption, at various points on the machine producing the web and using this data to determine the inherent viscosity of the resin being produced.

The inherent viscosity measuring technique of the invention particularly lends itself to modern data processing. In this regard, according to one important aspect of the invention, a computer is used to calculate theoretical extruder power assuming a value for inherent viscosity and compare this with the actual power consumed to obtain an indication of actual inherent viscosity.

According to a preferred embodiment, the web producing machine includes a motor-driven metering extruder, and the power consumed thereby is calculated by measuring the power input to the motor which, in a specific example, is determined by measuring the voltage and current input to the motor. It has been found that the temperature of the barrel of the extruder is also important in calculating the theoretical extruder horsepower and a temperature sensor is used to provide a measurement of the actual barrel metal temperature. As is discussed in detail hereinbelow, the barrel temperature used in determining theoretical extruder horsepower is calculated using the measured barrel metal temperature at a point within the barrel wall, as well as the heat transfer which is determined using the measured voltage and current applied to the motor driving the metering extruder.

It has also been found that different values for barrel temperature and barrel clearance should be used, depending on the value of the calcuated barrel temperature. This results from the fact that cooling, recessitated in attempting to maximize the extruder output, often causes a solid resin layer to form on the inner surface of the extruder barrel, and this affects the power consumed by the extruder motor. Thus, where the calculated barrel temperature is less than a critical value, the actual clearance is calculated, rather than using a nominal clearance Figure arrived at from the geometry of the extruder and screw.

The viscosity of the resin is also affected by the shear rate between the inner barrel wall and the extruder screw. The shear rate is, in turn, a function of the actual clearance, which is derived by one of the two ways discussed above, depending on the value of the calculated barrel temperature, and the screw speed, which is also measured using a suitable device such as a tachometer. The calculated shear rate is used in deriving a value for the calculated ratio of the viscosity of the resin in the clearance space between the inner barrel wall and extruder screw and the viscosity in the channel, i.e., the area adjacent the root of the extruder screw.

The effective average polymer resin temperature is also determined and is used in the actual calculation of theoretical power. This temperature is an average of the resin temperature leaving the barrel, which is monitored using a further temperature sensor, and the temperature of the barrel itself, which is derived as set forth above.

The quantities calculated above are used in combination with a further measured quantity, filter pressure, to determine inherent viscosity. As mentioned above, inherent viscosity is an empirical measurement of the molecular weight of the resin and hence can be used in controlling the characteristics of the product produced and in monitoring machine operation. To this end, display devices may be used to display the values determined and alarm devices utilized to indicate when the inherent viscosity exceeds or falls below predetermined limits or when the rate of change thereof exceeds a predetermined value.

The invention and its objects and advantages will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which:

FIG. 4 is a flow chart or diagram of operations performed by the data processor of FIG. 2 that is useful in describing the invention; and FIG. 5 is a table of data processor memory locations containing quantities used in determining inherent viscosity.

DESCRIPTION OF THE PREFERRED EMBODIMENT

Figure 1:
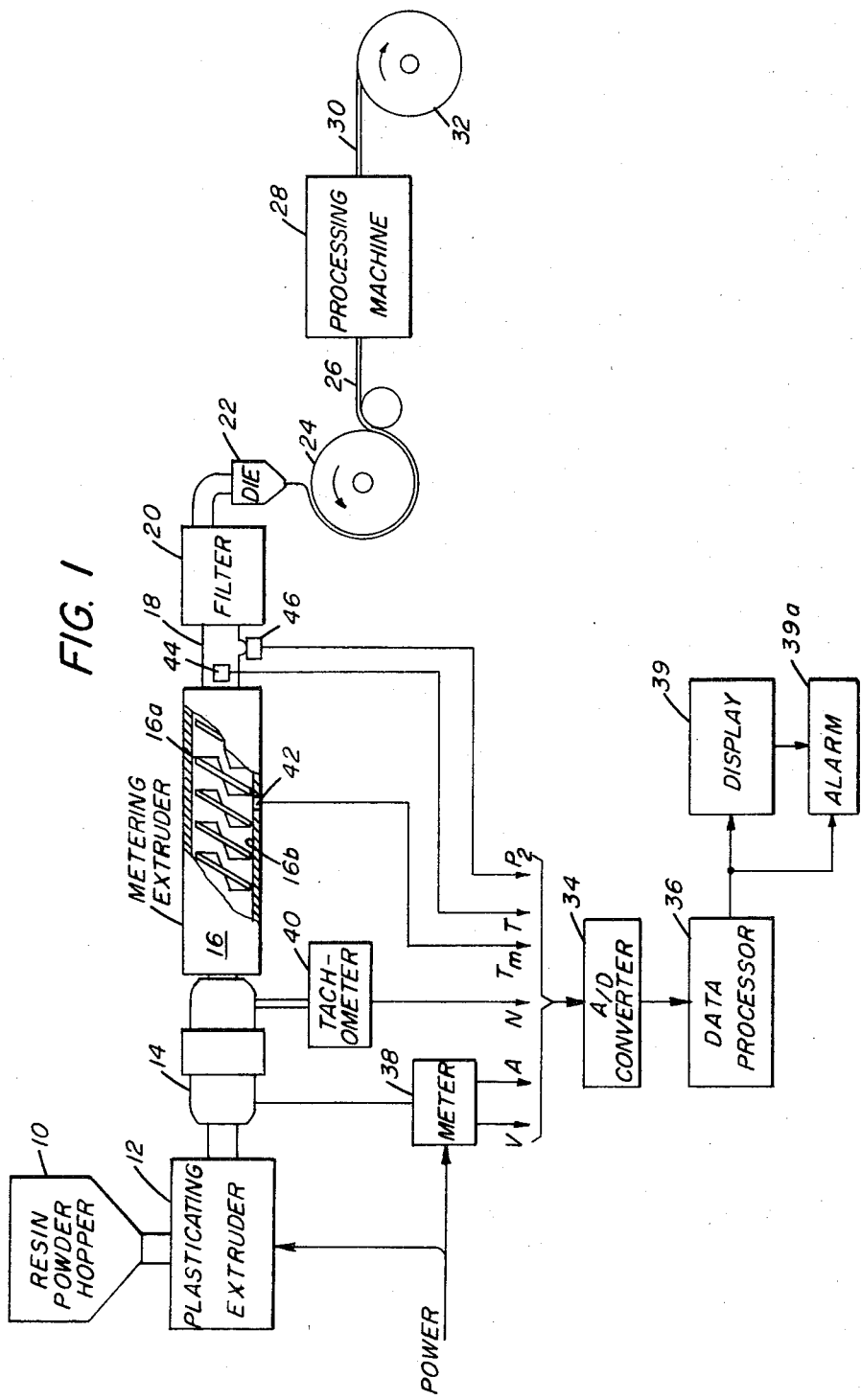
FIG. 1 is a schematic diagram, partially in block form, of a web producing machine incorporating the invention.

The invention can perhaps be best understood by considering the same as incorporated in a basic web producing machine. Because such machines are well known, the present description will be directed in particular to elements forming part of, or cooperating more directly with, the present invention, it being understood that elements which are not specifically shown or described may take various forms well known to those skilled in the art. Thus, referring to FIG. 1, a schematic block diagram of a system for converting a polymer resin into a plastic web is shown. In this system, the resin, in a powdered form, is transferred from an input hopper 10 to a plasticating extruder 12 where the powder is melted. The melted resin is metered from the plasticating extruder 12 by a screwtype metering extruder 16, which includes a metering screw 16a driven by an electrical motor 14. The resin from metering extruder 16 is extruded through an extruder barrel 18 to a filter 20 and is then passed through a die 22 onto a cooled roller 24 to form the requisite plastic web 26. The web 26 is removed from the roller 24 and processed in a suitable processing machine 28 wherein the web may typically be heated, stretched, heat set, and cooled. The finished web product 30 is taken up on a roller 32.

In accordance with the invention, in order to produce an indication of the inherent viscosity of the liquid resin, analog data representing physical conditions at various points in the system is provided and is continuously supplied to an analog-to-digital (A/D) converter 34, which converts this data to digital form. A suitably programmed data processor 36 periodically reads the digital data output of the A/D converter 34 and manipulates the same to produce an indication of the inherent viscosity of the melted resin being metered by metering extruder 16. As stated hereinabove, in the broader aspects thereof, the invention concerns using the power input to the extruder to determine the inherent viscosity of the liquid, although in the specific example to be considered, and in accordance with further important aspects of the invention, a number of additional related factors are utilized to produce an accurate approximation of the inherent viscosity.

To determine the input power to the metering extruder 16, a suitable meter 38 is connected to the power input as indicated in FIG. 1 to produce voltage and current readings, denoted V and A. A tachometer 40 is connected to electrical motor 14 to provide an indication of the rotational speed, N, of the screw 16a of screw-type metering extruder 16. Further, a temperature sensor 44 is used to determine the temperature, T, of metered product of extruder 16 while a further temperature sensor 42 determines the temperature, $T_M$, of the extruder barrel 18. Finally, a pressure sensor 46 serves to sense the filter pressure, denoted $P_2$. The various meters and sensors are, of course, conventional and can take a number of different, commercially available forms.

In accordance with the preferred embodiment of the invention, the various quantities, V, A, N, T, $T_M$, and $P_2$ derived as set forth above are utilized to provide an expression of inherent viscosity. However, before considering the manner in which the variables in question are utilized to produce such an indication or measurement, the operation of data processor 36 will be considered generally. To this end, reference is made to FIG. 2 which illustrates the basic components or units of data processor 36. It will be appreciated that these components form the standard subassemblies of any general purpose data processor and, accordingly, these components will not be described in any detail. In view of the fact that data processors are well known, the makeup and operation of the data processor shown in FIG. 2 will be described together. In brief, the program for the data processor 36, and the input data therefor, are stored in memory 40. This is done by reading this information into memory 40 from an input logic unit 42 under the control of a read/write logic unit 42. When the program is executed, the instructions are accessed one at a time from their respective locations in the memory 40 through the read portion of the read/write logic unit 42. The particular instruction to be accessed at a given time is determined by the instruction address data in an instruction address register 46. In normal operation, an initial instruction address is stored in register 46 to begin the execution of a program, and this is the address of the first program instruction to be accessed from memory 40. After each instruction is accessed, the contents of register 46 are incremented by "1" by an adder 48 to obtain the next instruction address, unless control of the data processor 36 is to be transferred to an instruction that is out of sequence. In the latter case, a transfer instruction, containing the address of the next instruction to be executed, is read from memory 40, and decoded, and the next instruction address is transferred from an instruction register 50 through a gate circuit 52 to the instruction address register 46.

With an instruction address in instruction address register 46, read/write logic unit 44 is enabled and the instruction in the memory location in memory 40 identified by the address is stored in the instruction register 50. An instruction decoder 54 responds to the instruction in the instruction register 50 by generating signals that enable the subassemblies in the data processor 36 which are required to perform the operation(s) specified in the instruction.

Figure 3:
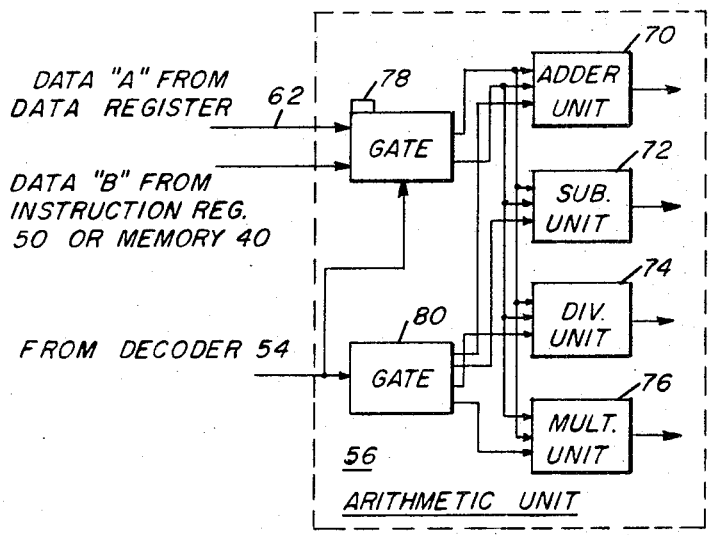
FIG. 3 is a schematic circuit diagram, in block form, of the arithmetic unit of FIG. 2.

For example, where the instruction in the address register 50 is an ADD instruction, the instruction decoder will enable an arithmetic unit 56. As shown in FIG. 3 and described in more detail hereinbelow, the arithmetic unit 56 itself is made up of a number of further units or sub-units. The ADD instruction may contain the memory addresses of the two pieces of data to be added or, alternatively, may contain one memory address and one piece of data. In essence, the decoder 54 generates signals that enable the adder unit 70 of arithmetic unit 56. Simultaneously, the decoder 54 generates signals that open a further gate circuit 58 to transfer the memory address of one of the pieces of data from the instruction register 50 to a data address register 60. This results in the data in the addressed memory location being accessed from memory 40 by the read portion of read/write logic unit 44 and stored in a data register 62 by means of a further gate circuit 64. As previously mentioned, the other item or piece of data may be contained in the instruction in instruction register 50 or this piece of data may be in another location in the memory 40 which is identified by a second data address in the instruction in question. If in the memory 40, the data is accessed, similarly to the first piece of data, and then, in contrast, is directly applied to arithmetic unit 56. Alternatively, where the data is a part of the instruction, the data is simply applied directly to the arithmetic unit 56. In the latter instance, referring to FIG. 3, signals from the instruction decoder 54 enable the adder unit 70 of arithmetic unit 56 through a gate 80, and the two pieces to be applied to the adder unit 70 by means of a further gate 78 enabled by the instruction decoder. Although the example given has been concerned with the operation of data processor 36 for adding two pieces of data, it will be appreciated that similar operations are involved when subtraction, division, or multiplication are to be performed and, to this end, arithmetic unit 56 includes a subtraction unit 72, a division unit 74, and a multiplication unit 76. As mentioned hereinafter, special well-known program subroutines are provided as part of the specific data processing system under consideration to control the operation of the data processor arithmetic unit 56 during the performance of the logarithmic operations discussed below.

Figure 2:
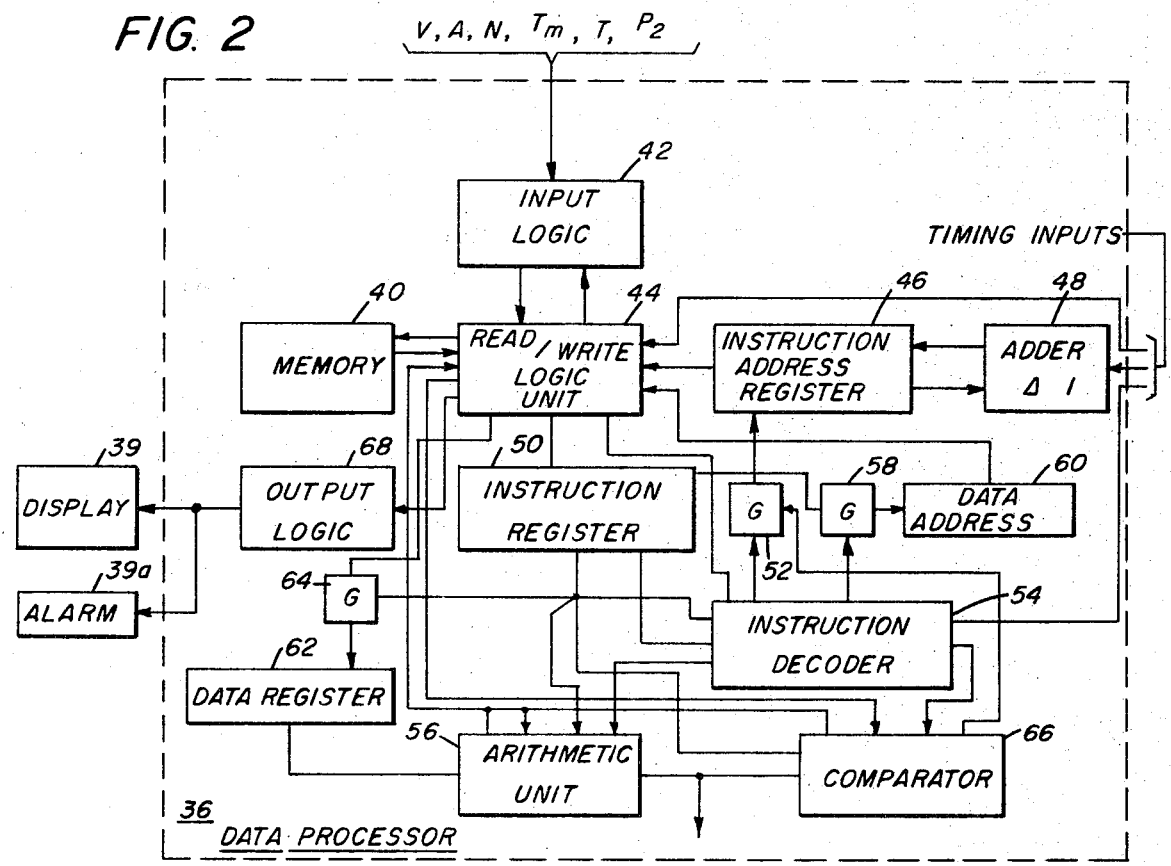
FIG. 2 is a schematic circuit diagram, in block form, of the data processor of FIG. 1.

As shown in FIG. 2, data processor 36 also includes further conventional subassemblies including a conventional comparator unit 66 and a logic output unit 68 which is connected to the write portion of read/write logic unit 44 and the output of which is connected to a display and alarm devices 39 and 39a, respectively, described below.

With this background, the operation of data processor 36 will be considered relative to processing the input data derived as discussed in connection with FIG. 1. This operation will be considered in conjunction with FIG. 4 which is a flow chart of the operations performed by the data processor 36 in determining inherent viscosity in accordance with the invention. Thus, referring particularly to FIGS. 2 and 4, step A.1, the reading in of the variables N, V, A, T, $T_M$, and $P_2$ is performed by reading this data, which has been converted to digital form in the A/D converter 34, into memory 40 under the control of read/write logic unit 44. As shown in FIG. 5, the data in question is stored in memory locations in memory 40 indicated in FIG. 5 as locations ML11 through ML16.

Step A.2 involves calculating the operating horsepower, that is, the actual horsepower developed by motor 14 of FIG. 1. To this end, a sequence of instructions are read from memory 40 into the instruction register 50 and decoded by instruction decoder 54. This results in accessing of the variables V and A, which, as stated, respectively correspond to the voltage and current applied to the motor 14 driving metering extruder 16, and are stored in memory locations ML12 and ML13 (FIG. 5), together with a constant, 746, stored in memory location ML27 and the subsequent combination of the accessed information in accordance with a formula for calculating horsepower, $Z_1$. The formula in question is $Z_1 = V \times A/746$ and the required multiplication is performed by the multiplication unit 76 (FIG. 3) of arithmetic unit 56. A corrected value of power, Z, is produced by using the formula $Z = 0.88 Z_1$, where 0.88 equals the assumed efficiency of motor 14.

The product Z obtained by step A.2 is used in step A.3 to calculate the average transfer due to cooling, denoted Q, in BTU/hr., in accordance with the formula or equation $Q = 2,545 \times Z$. To perform this calculation, an instruction is read from memory 40 into instruction register 50, the decoding of which results in multiplication unit 76 of arithmetic unit 54 multiplying the previously determined variable Z by a constant 2545 which is accessed from memory location ML28 (FIG. 5) of memory 40 (FIG. 2). The resultant product, Q, is then stored in location ML19 (FIG. 5) of memory 40.

Step A involves calculating, to the extruder barrel temperature or, more specifically, the temperature of the inner surface of the extruder barrel 16. This calculation is necessary in the calculation of theoretical extruder horsepower. The calculation is performed in accordance with the formula:

$$To = Tm + {}_Q[R_o ln(R_1/Ro)/12K_x + R_o ln(R_m/R_1)/12K_m/2 \ \pi R_o L/144]$$

wherein Tm and Q are, as discussed above, the temperature of the barrel metal of the metering extruder in degrees Fahrenheit and the heat transfer due to cooling in BTU/hr., respectively, and wherein $R_o$ is inner radius of a liner used inside the barrel 16, in inches, $R_1$ is the outer radius of the liner in inches, $R_m$ is the radial position, in inches, of the barrel metal thermocouples which comprise the sensor 42 of FIG. 1, $K_x$ is the thermal conductivity of the barrel liner in BTU/hr. ft. F°, $K_m$ is the thermal conductivity of the barrel metal in BTU/hr. ft. F°, and L is the length of the barrel in inches. The values $R_o$, $R_1$, $R_m$, $K_x$, $K_m$, and L are respectively stored in the memory locations ML6, ML7, ML8, ML1, ML2, and ML9 (FIG. 5), and are accessed and combined with the values $T_m$ and Q in a manner similar to that discussed above.

As mentioned above and as is indicated in the flow diagram of FIG. 5, a further calculation is made or not made, depending on whether the calculated value of $T_o$ equals or exceeds the value of a critical temperature, $T_c$. This temperature, in practice, is taken to be approximately the melting point of the resin being processed. Also as mentioned, the reason for this approach is that when the inner surface of the extruder barrel liner, hereinafter referred to as the inner barrel wall, in metering extruder 16 (FIG. 1) is cool enough, a solid polymer resin layer will be formed on this surface. This phenomenon is actually encountered quite often in normal operation and results from an attempt to minimize the throughput put of extruder 16, thereby necessitating a cooling of the extruder barrel to remove excess heat energy. When a solid polymer resin layer forms on the inner surface of the barrel wall, due to the surface temperature thereof dropping to a predetermined value or below, the power consumed by the extruder motor 14 (FIG. 1) is affected. The variable $\delta A$, is a function of the thickness of the solid polymer resin layer on the interior of the extruder barrel wall, and the thickness of this layer is, in turn, a function of the heat transfer due to cooling. As indicated in FIG. 4, the data processor 36 (FIG. 1) determines in step A.5 whether the calculated value $T_o$ is equal to or greater than $T_c$, i.e., the approximate melting point of the resin being processed. If so, data processor 36 performs the operations in step A.6 and thus assigns $T_o$ as the value for $T_s$ and $\delta$ as the value for $\delta A$ in the calculations to be discussed hereinbelow, $T_s$ bein the inner barrel surface temperature in degrees Fahrenheit and $\delta$ being the nominal flight clearance derived by subtracting the screw crest radius from the barrel radius. If $T_o < T_c$, the actual clearance is calculated as indicated in step A.7 of FIG. 4 using the formula:

$$\delta A = \delta - R_o[\,1 - \exp.:(T_o - T_s)\,2\pi LK/12Q:\,],$$

where $\delta$, $R_o$, $Q$, $L$, and $T_o$ are as defined above, where $T_s$ is taken as $T_c$, the approximate melting point of the resin in degrees Fahrenheit, and where $k$ = thermal conductivity of the polymer film in BTU/hr. ft. °F. The constant $k$ is stored in memory location ML3 (FIG. 5) and, again, the calculations proceed generally as outlined above. The result of this calculation is used as $\delta A$ for ensuing calculations, whereas $T_s$ is, as stated, taken to be $T_c$ for these calculations.

The viscosity of the resin is also affected by the shear rate between the inner barrel wall of extruder 16 and the extruder screw 16a. This shear rate is itself a function of the speed of screw 16a and the actual clearance. A, which is derived in accordance with the formula $$\dot{\gamma} = \pi DN/60\,\delta A = \pi R_o N/30\,\delta A,$$

with N being the digital equivalent of rotational speed of the screw 16a as derived by tachometer 40 as discussed above in connection with FIG. 1. The values $\pi$, $Q$, and $\delta A$ are respectively stored in memory locations ML4, ML19, and ML21, and the calculation is performed by data processor 36 as described hereinbefore.

The next step, step A.9, involves, as indicated in FIG. 4, the calculation of the ratio $\mu_L/\mu$. The variables $\mu_L$ and $\mu$ represent viscosities of the resin at selected points within the metering extruder when the temperature of the resin is assumed to be $T_{ref}$, a temperature at which it is desired to process the resin. The variable $\mu_L$ represents the calculated viscosity of the resin in the actual clearance between the extruder screw 16a and the solid resin layer on the inner barrel wall of the metering extruder 16. The value $\mu$ is an empirically determined constant representing the viscosity of the resin in the "channel," i.e., the area surrounding the root of screw 16a when relatively little shear is being experienced. The viscosity ratio is calculated using the formula $\mu_L/\mu = \exp.\,[a + b\,\ln\dot{\gamma} - d\,\ln^2\dot{\gamma}/e]$, where $a$, $b$, $d$, and $e$ are constants. The numerator of this equation defines a curve resulting from plotting resin viscosity versus shear rate and it is obtained by techniques well known to those skilled in the art. The quantity $\dot{\gamma}$ has, of course, just been calculated and is stored in memory location ML23. The denominator $e$ is a function of the reference temperature $T_{ref}$ mentioned above.

Step A.10 involves calculating the average polymer resin temperature which is the average of the temperature of the polymer resin leaving the barrel of extruder 16 and the temperature of the barrel itself. This average is used in the calculation of theoretical power and is derived using the formula $T_{AV} = T_s + f(T - T_s)$, where $T_s$ is derived as set forth above, where $T$ is temperature of the extruder product temperature as determined by temperature sensor 44 of FIG. 1, and where $f$ is an empirical averaging factor. The quantities $f$ and $T_s$ are stored in memory locations ML18 and ML22 (see FIG. 5), while the quantity $T$ is, as stated above, stored in memory location ML14.

In the final step, step A.11 of FIG. 5, the inherent viscosity, which is denoted IV, is calculated. As stated hereinabove, the resin melt viscosity is proportional to the power consumed by extruder 16. The data processor 36 calculates a theoretical extruder power, using an assumed inherent viscosity of the resin equal to $IV_A$, where $IV_A$ is selected from a range of inherent viscosity values that are suitable for the polymer resin processing being performed. The calculated power is compared with the actual power consumed by metering extruder 16 and an estimate of the IV of the polymer resin obtained. This is expressed by the formula $IV = IV_A\,[Z/Z_T]^g$, where $Z$ is the actual measured power consumption of the extruder 16 and $Z_T$ is the theoretically calculated power when the viscosity of the resin is assumed to be 0.63. The variable $g$ is empirically determined, using the equation $IV = \mu^g$, by comparing the inherent viscosity and melt viscosity of various samples of the resin. The complete formula is:

$$IV = IV_A\,[Z[\exp.\,(hP2 + s/T_{AV} + 460 - s/T_{ref})\cdot C\cdot(G_{13} + G4\,\delta/\delta A\,\mu L/\mu\,\mu N^2)]]$$

where $P_2$ is the filter pressure in lb/in² as determined by pressure transducer or sensor 46 of FIG. 1h is the Eyring pressure coefficient in in²/lb, C is an empirical correction factor, $G_{13}$ and $G4$ are constants related to screw geometry, s is the slope of the Arrhenius plot (in melt viscosity versus the reciprocal of the absolute temperature of the resin), and $T_{ref}$ is the previously defined reference temperature in degrees absolute.

In accordance with the presently preferred operation procedures, calculations of instantaneous IV were made every two minutes. The values obtained are retained in a memory, such as memory 40, and are averaged to produce a moving average. This moving average is checked to see if the average exceeds either an upper or lower IV limit or if the rate of change thereof is greater than a predetermined value. If any of these limits are exceeded, the data processor may display data in typewritten form and activate annunciators to notify operators of the extruder of the condition. These devices are shown as the display 39 and alarm 39a in FIG. 1.

As stated hereinabove, data processor 36 can take the form of any one of numerous well-known stored program data processing systems. In the particular embodiment under consideration, the data processor used is a Westinghouse P250 data processing system. The program used to control this data processor was written in FORTRAN IV and the data processing system includes the complete library of mathematical program subroutines normally supplies with a data processing system designed to execute FORTRAN IV programs. In this regard, it is noted that special program subroutines are provided as a part of the Westinghouse system to perform the logarithmic operations referred to above. Table I found hereinbelow is the FORTRAN IV program listing which is a symbolic representation of the instruction signals and data used to control the data processing components shown in FIGS. 2 and 3 as described above, during the performance of the steps shown in the flow chart of FIG. 4. Table II is a chart which aids in explaining the program listing of Table I and relating the quantities set forth in Table 1 to those discussed above. It should be noted that the flow chart of FIG. 4 does not show the initialization ane data handling required to make the calculations on plural machines, calculate the averages referred to above, check the alarm limits, print the summary, and perform other tasks which are not related to actual computation of inherent viscosity.

TABLE I

```
102:    C     *****
103:          CALCULATION OF INHERENT VISCOSITY
104:    C     *****
105:        5 Z=ANAN(MV(I))*ANAV(MPA(I))/746.
106:          T2=ANAV(MT2(I))
107:          TM=ANAV(MTM(I))
108:          P2=ANAV(MP2(I))
109:    C     *****
110:          CALCULATE INNER WALL TEMPERATURE
111:    C     *****
112:          Q=.88*Z*2545.
113:          A1=R(2)*ALOG(R(1)/R(2))/(12.*TK(1))
114:          A2=R(2)*ALOG(R(3)/R(1))/(12.*TK(2))
115:    C     *****
116:          COMPENSATE IF WALL TEMPERATURE IS LOW
117:    C     *****
118:          TO=TM+(Q*(A1+A2)/(2.*3.1416*R(2)*EL/144.))
119:          IF(TO-TC)10.20.20
120:       10 TS=TC
121:          DELA=DEL(I)-R(2)*(1.-EXP((TO-TS)*3.1416*EL*TK
                 (3)/6./Q))
122:          GO TO 30
123:       20 TS=TO
124:          DELA=DEL(I)
125:       30 IF(DELA.LT..005)DELA=.005
126:          SHEAR=3.1416*R(2)*ANAV(MRPM(I))/30./DELA
127:          RATIO=EXP(CA+ALOG(SHEAR)*(CB-CD*ALOG(SHEAR)))
128:          TAV=TS+TAF*(T2-TS)
129:          A3=BCOEFF*P2+CS./(TAV+460.)-CS/T_{ref}
130:          A4=EXP(A3)*c(I)*(G13(I)+G4(I)*DEL(I)/DELA*RATIO*
                 ANAV(MRPM(I))**2.
131:          1*2516.
132:          RIV=IV_A*(.88*Z/A4)**CG
```

TABLE II

| STMT. No. | PROGRAM LISTING QUANTITY | CORRESPONDING QUANTITY | DESCRIPTION |
|---|---|---|---|
| 105 | MV(I) | V | |
|  | MPA(I) | A | |
|  | 746. | | Conversion from watts to horsepower |
| 106 | MT2(I) | T | |
| 107 | MTM(I) | $T_m$ | |
| 108 | MP2(I) | $P_2$ | |
| 112 | .88 | | Assumed drive efficiency |
|  | 2545. | | Conversion from HP to BTU/HR |
| 113 | R(2) | $R_o$ | |
|  | R(1) | $R_I$ | |
|  | TK(1) | $k_r$ | |
|  | R(3) | $R_m$ | |
|  | TK(2) | $k_m$ | |
| 118 | EL | L | |
| 120 | TC | $T_c$ | Temperature of surface of polymer layer in °F. |
| 121 | DELA | A | |
|  | DEL(I) | | |
|  | TK(3) | $k$ | |
| 126 | MRPM(I) | N | |
|  | SHEAR | | |

TABLE II – Continued

| STMT. No. | PROGRAM LISTING QUANTITY | CORRESPONDING QUANTITY | DESCRIPTION |
|---|---|---|---|
| 127 | CA | a | Constants to describe the relationship of melt viscosity to shear rate (shear viscosity in channel at $T_{ref}$ and assumed inherent viscosity $IV_A$) |
|  | CB | b |  |
|  | CD | d |  |
|  | CE | e |  |
| 128 | TAF | f | Empirical temperature averaging factor |
| 129 | BCOEFF | h |  |
|  | CS | s | Constants which relate melt viscosity to temperature |
| 130 | C(I) | C | Empirical correction factor |
|  | G13(I) |  | Constants derived from screw geometry which relate power to screw speed and viscosity |
|  | G(4) |  |  |
| 131 | 2516. |  | See statement 127 |
| 132 | .09273 |  |  |
|  | CG | g | Relates viscosity (power) ratio to IV |

As stated on more than one occasion hereinabove, it is well known that the calculations discussed hereinbefore can be made using other techniques. For example, the various calculations referred to can be performed by individual components designed for that purpose, such as commercially available digital subassemblies wired together to operate as described above or by analog devices, and that such components may take any of a variety of forms, as indicated, for example, in "Electric Analog Computers," Korn and Korn, McGraw Hill Publishing Company, Inc., 1952.

The invention has been described in detail with particular reference to preferred embodiments thereof, but it will be understood that variations and modifications can be effected within the spirit and scope of the invention.

I claim:

1. A machine method for determining the inherent viscosity of a liquid being processed in an extruder, said method comprising the steps of:
   1. determining the value of actual power consumed by the extruder at a selected time during the extrusion process, and
   2. converting the value of actual power into data representing the inherent viscosity of the liquid by
      a. determining the value of the theoretical power consumed by the extruder in extruding a liquid with a predetermined value of inherent viscosity, and
      b. comparing the value of the actual power consumed by the extruder with the determined value of the theoretical extruder power.

2. A machine method for determining the inherent viscosity of a liquid resin, being processed in an extruder driven by an electrical motor, by means of an electronic data processor, comprising the steps of:
   detecting the electrical power being consumed by the motor at a selected time,
   detecting the operating speed of the motor,
   detecting the temperature at a selected point on the extruder barrel wall and the temperature of the liquid being extruded,
   converting the detected data to digital form,
   determining the actual power being consumed by the extruder from the digital data representing the detected electrical power,
   determining the theoretical power consumed by the extruder in extruding the liquid, when the liquid has a predetermined inherent viscosity, from the digital data representing the detected operating speed of the motor and the detected temperatures, and
   determining the inherent viscosity of the liquid as a function of the ratio of the determined actual power and theoretical power.

3. In a system for extruding a liquid polymer resin, including an extruder and a motor for driving the extruder, the combination comprising:
   means for determining the actual power being consumed by said motor in driving said extruder at a selected time,
   means for detecting the operating speed of said motor,
   means for detecting selected temperatures related to said extruder and said resin,
   means responsive to the detected motor operating speed and temperatures for determining a theoretical power consumption for said motor when said resin is assumed to have a selected inherent viscosity, and
   means responsive to the determined actual power and the determined theoretical power for generating data representing the inherent viscosity of said resin.

4. The system of claim 3 further including a filter for filtering the extruded resin and means for detecting the resin pressure in said filter, wherein the means for determining the said theoretical power consumption is further responsive to said means for detecting said resin pressure in said filter.

5. The system of claim 3 wherein the means for detecting temperatures further comprises:
   means for detecting the temperature at a selected point in the wall of said extruder, and
   means for detecting the temperature of said resin as it leaves said extruder.

6. The system of claim 3 wherein said means for detecting the operating speed of said motor further comprises:
   a tachometer mechanically coupled to said motor for generating a signal with a magnitude related to the value of said speed, nd
   means for converting the output of the tachometer output signal into digital signals.

7. The system of claim 3 wherein said motor is an electrical motor and the means for determining actual power further comprises:
   means for detecting the voltage applied to said motor, and
   means for detecting the current drawn by said motor.

* * * * *